US012444398B1

(12) United States Patent
Helwani et al.

(10) Patent No.: US 12,444,398 B1
(45) Date of Patent: Oct. 14, 2025

(54) MANIFOLD LEARNING FOR SOUND FIELD ESTIMATION

(71) Applicant: Amazon Technologies, Inc., Seattle, WA (US)

(72) Inventors: Karim Helwani, San Mateo, CA (US); Michael Mark Goodwin, Scotts Valley, CA (US); Paris Smaragdis, Urbana, IL (US)

(73) Assignee: Amazon Technologies, Inc., Seattle, WA (US)

( * ) Notice: Subject to any disclaimer, the term of this patent is extended or adjusted under 35 U.S.C. 154(b) by 113 days.

(21) Appl. No.: 18/476,197

(22) Filed: Sep. 27, 2023

(51) Int. Cl.
*G10K 11/178* (2006.01)

(52) U.S. Cl.
CPC .. *G10K 11/17823* (2018.01); *G10K 11/17873* (2018.01); *G10K 2210/12* (2013.01); *G10K 2210/3027* (2013.01); *G10K 2210/3028* (2013.01); *G10K 2210/3035* (2013.01); *G10K 2210/3038* (2013.01); *G10K 2210/505* (2013.01)

(58) Field of Classification Search
CPC ....... G10K 11/17823; G10K 11/17873; G10K 2210/12; G10K 2210/3027; G10K 2210/3028; G10K 2210/3035; G10K 2210/3038; G10K 2210/505
USPC ........................................................ 381/66
See application file for complete search history.

(56) References Cited

U.S. PATENT DOCUMENTS

2002/0071573 A1* 6/2002 Finn ........................ H04M 9/08 381/95
2003/0235312 A1* 12/2003 Pessoa ..................... H04B 3/23 381/66
2014/0307882 A1* 10/2014 LeBlanc ................ H04S 7/305 381/66
2023/0224635 A1* 7/2023 Tian .................... G10L 21/0232 381/66

OTHER PUBLICATIONS

Belkin et al., "Laplacian eigenmaps and spectral techniques for embedding and clustering," Advances in neural information processing systems, vol. 14, 2001.
Berkhout et al., "A holographic approach to acoustic control," Journal of The Audio Engineering Society, vol. 36, pp. 977-995, 1988.

(Continued)

*Primary Examiner* — Vivian C Chin
*Assistant Examiner* — Douglas J Suthers
(74) *Attorney, Agent, or Firm* — Knobbe, Martens, Olson & Bear, LLP

(57) ABSTRACT

System and methods are provided for estimating the sound field from partial observations. Estimating an acoustic environment for virtual reality and augmented reality applications is a step in the creation of simulated acoustic sound scenes. In particular, the impulse responses of room can be estimated with a generative model. In a teleconferencing scenario with remote participants and a group of participants in a common physical space, giving the remote participants the impression that all other participants are sitting is in the same room acoustically requires filtering the speech of the remote participants with impulse responses estimated at the desired rendering position in the conference room.

20 Claims, 5 Drawing Sheets

(56) References Cited

OTHER PUBLICATIONS

Benesty et al., "A robust fast recursive least squares adaptive algorithm," in 2001 IEEE International Conference on Acoustics, Speech, and Signal Processing. Proceedings (Cat. No. 01CH37221), 2001, vol. 6, pp. 3785-3788 vol. 6.
Boche et al., "Limitations of deep learning for inverse problems on digital hardware," arXiv preprint arXiv:202.13490, 2022.
Buchner et al., "Adaptive dynamical systems in compressive domains as a manifold learning framework," in SPARS Workshop, 2015.
Buchner et al., "A systematic approach to incorporate deterministic prior knowledge in broadband adaptive mimo systems," in 2010 Conference Record of the Forty Fourth Asilomar Conference on Signals, Systems and Computers. IEEE, 2010,pp. 461-468.
Buchner et al., "Unsupervised bayesian estimation and tracking of time-varying convolutive multichannel systems," in 2019 22th International Conference on Information Fusion (Fusion). IEEE, 2019, pp. 1-8.
Casebeer et al., "Meta-af: Meta-learning for adaptive filters," arXiv preprint arXiv:2204.11942, 2022.
Coifman et al., Applied and Computational Harmonic Analysis, vol. 21, No. 1, pp. 5-30, 2006, Special Issue: Diffusion Maps and Wavelets.
Donoho et al., "Hessian eigenmaps: Locally linear embedding techniques for high-dimensional data," Proceedings of the National Academy of Sciences, vol. 100, No. 10, pp. 5591-5596, 2003.
Edelman et al. "The geometry of algorithms with orthogonality constraints," 1998.
Griffiths et al., "An alternative approach to linearly constrained adaptive beamforming," IEEE Transactions on Antennas and Propagation, vol. 30, No. 1, pp. 27-34, 1982.
Helwani et al., "Multichannel adaptive filtering in compressive domains," in 2014 14th International Workshop on Acoustic Signal Enhancement (IWAENC). IEEE, 2014, pp. 174-177.
Helwani et al., "Multichannel adaptive filtering with sparseness constraints," in IWAENC 2012; International Workshop on Acoustic Signal Enhancement, 2012, pp. 1-4.
Kumar et al., "Variational inference of disentangled latent concepts from unlabeled observations," 2017.
Luo et al., "Gaussian process models for hrtf based sound-source localization and active-learning," arXiv preprint arXiv:1502.03163, 2015.
Moor et al., "Topological autoencoders," 2021.
Posada et al., "Simplicial autoencoders: A connection between algebraic topology and probabilistic modelling," 2018.
Plumbley, "Geometry and manifolds for independent component analysis," in 2007 IEEE International Conference on Acoustics, Speech and Signal Processing—ICASSP '07, 2007, vol. 4, pp. IV-1397-IV-1400.
Roweis et al., "Nonlinear dimensionality reduction by locally linear embedding," science, vol. 290, No. 5500, pp. 2323-2326, 2000.
Scheibler et al., Eric Bezzam, and Ivan Dokmanic, "Pyroomacoustics: A python package for audio room simulation and array processing algorithms," in 2018 IEEE International Conference on Acoustics, Speech and Signal Processing (ICASSP). Apr. 2018, IEEE.
Shun-Ichi et al., "Natural Gradient Works Efficiently in Learning," Neural Computation, vol. 10, No. 2, pp. 251-276, Feb. 1998.
Talmon et al., "Diffusion maps for signal processing: A deeper look at manifold-learning techniques based on kernels and graphs," IEEE signal processing magazine, vol. 30, No. 4, pp. 75-86, 2013.
Valin et al., "A hybrid dsp/deep learning approach to realtime full-band speech enhancement," 2017.
Valin et al., "Low-complexity, real-time joint neural echo control and speech enhancement based on percepnet," 2021.

* cited by examiner

MANIFOLD LEARNING FOR SOUND FIELD ESTIMATION

BACKGROUND

In adaptive filtering, a set of coefficients in a vector or a matrix can be continuously optimized based on received input signals, requirements on the desired output signal, and a cost function. An adaptive filter is a system that can have a transfer function controlled by variable parameters and a means to adjust those parameters according to an algorithm.

In audio systems that include a microphone and output speakers, an acoustic echo canceler (AEC) is typically implemented to prevent the speaker signal captured by the microphone to be sent back to the far end and thereby causing disturbing echoes. In an AEC context, far end refers to the location of a far end signal (voice audio originating at the other end of a line of communication) and the near end (which could be a conference room, for example) is opposite the far end. An AEC can use an adaptive filter. An impulse response can refer to the output of a dynamic system when presented with a brief input signal, referred to as an impulse. An AEC algorithm can compare the microphone audio to the audio being sent to the speaker to generate an impulse response. The AEC algorithm can use the impulse response as the basis for a filter that is used to eliminate the speaker audio from the microphone signal.

The sound field of a room can be estimated with many measurements. For example, a microphone array with thirty-two microphones can be used to perform many impulse response measurements and those measurements can be used to estimate the sound field of the room. The measurements from a single microphone at a single position in a room is generally insufficient to estimate the sound field of the room.

BRIEF DESCRIPTION OF THE DRAWINGS

These and other features, aspects, and advantages are described below with reference to the drawings, which are intended for illustrative purposes and should in no way be interpreted as limiting the scope of the embodiments. Furthermore, various features of different disclosed embodiments can be combined to form additional embodiments, which are part of this disclosure. In the drawings, like reference characters can denote corresponding features throughout similar embodiments. The following is a brief description of each of the drawings.

DETAILED DESCRIPTION

Figure 1:
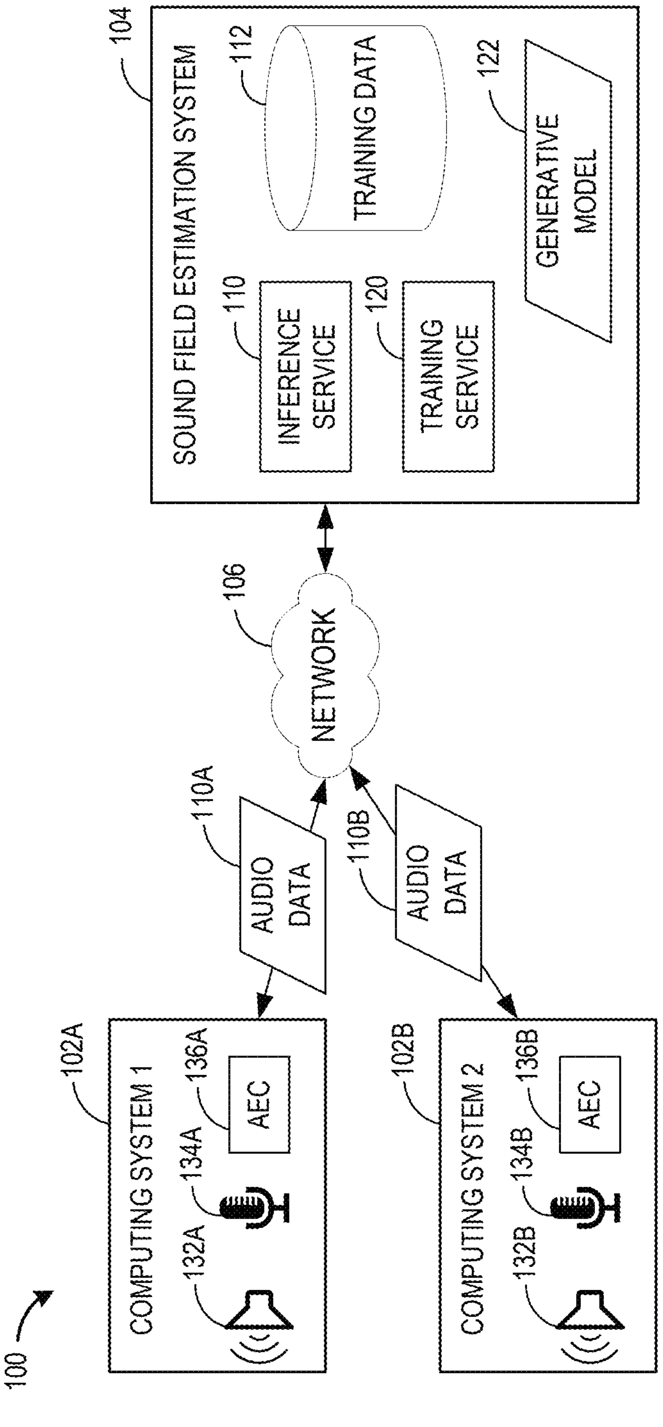
FIG. 1 is a schematic block diagram depicting an illustrative network environment for estimating sound fields using partial observations.

Generally described, aspects of the present disclosure are directed to estimating sound fields using partial observations. In an audio context, such as virtual or augmented reality contexts, modeling an acoustic environment can advantageously allow creating sound scenes. For example, in a teleconference scenario with remote participants and a group of participants in a conference room, giving the acoustic impression that all participants are in the same room can be accomplished by filtering the speech of the remote participants with impulse responses measured in the conference room at the desired rendering position. However, this information may not be available for a room with a single microphone, for example. In adaptive filtering, a topology can be used to represent data in solving optimization problems, such as coefficient optimization. A manifold is a topological space that is locally Euclidean, i.e., around every point there is a Euclidean space. The manifold can be differentiable and it is possible to use calculus to define a Euclidean tangent space for each point in the manifold. Retraction can be used to map a point in the tangent space back to the manifold. In adaptive filtering, modeling data as a manifold and using tangent spaces and retractions can lead to decreased computational complexity and increased convergence speed in solving optimization problems.

As described herein, a trained generative model, such as a trained variational autoencoder, can be used to extrapolate the sound field at unknown positions in a new environment using partial observations. In particular, the optimization can be done in the Euclidean space and updated filter parameters can be determined via the generative model, which is a retraction that maps from the tangent space back onto the manifold, and the optimization can be performed. Accordingly, a sound field for a room can be estimated (the impulse responses) using partial observations, such as the input audio from a microphone and reference audio from an AEC from the single position in the room, and a trained generative model. The reference audio can refer to the signal sent to a speaker that in turn excites a room. As used herein, a room can refer to a part of a building for which a sound field can be estimated. A room can typically be a part of a building enclosed by walls, a floor, and a ceiling. A concert hall or a theater can be room.

The systems and methods described herein may improve computer performance to estimate a sound field. In adaptive filtering and in underdetermined systems, the computational complexity of solving optimization problems can be significant. Estimating a sound field with partial observations can be an underdetermined system where there are fewer equations in a system of equations than unknowns. As described herein, using manifolds, tangent spaces, and retractions can lead to decreased computational complexity and increased convergence speed in solving optimization problems. Training a machine learning model by means of manifold learning and using training data composed of measurements from multiple microphones in different spaces can output a generative model. Moreover, in some cases, the second order adaptive filtering described herein can result in convergence on an estimated sound field with fewer computational resources. Therefore, the systems and methods described herein can use learned manifolds to estimate a sound field based on partial observations with reduced computational resources. As used herein, the term “computing resource” can refer to a physical or virtual component of limited availability within a computer system. Computing resources can include, but are not limited to, computer processors, processor cycles, and/or memory.

The systems and methods described herein may improve computer performance to train machine learning models. As described herein, during training, a loss function can include a regularization term. The use of a regularization term can cause a representation of a Hessian matrix of the adaptive filter cost function to be approximately diagonal. Ensuring that the representation be approximately diagonal can enable the adaptation algorithm to execute using with fewer computing resources since the off-diagonal elements in the matrix can be ignored. The adaptation algorithm can be a second order adaptation. Second order adaptation algorithms may require calculating an inverse of a covariance matrix. Therefore, if the covariance matrix is diagonal then the inverse of the covariance matrix computation can be omitted. Therefore, the systems and methods described herein can result in training of machine learning models with fewer computing resources.

Turning to FIG. 1, an illustrative network environment 100 for estimating sound fields using partial observations is depicted. The components of the network environment 100 can enable creating sounds from remote participants in a room as if those participants are in the same room, and, in particular, reproduce speech in a manner that gives the acoustic impression that the speech was uttered from specific positions in the room. Thus, the components of the network environment 100 can improve virtual or augmented reality experiences with generated sounds that fit within the virtual or augmented reality environments. The network environment 100 may include computing systems 102A, 102B and a sound field estimation system 104. One use case of the network environment 100 can be for substantially real-time audio streaming between the computing systems 102A, 102B. Instead of requiring that large microphone arrays record the rooms for complete observations, the sound field estimation system 104 can advantageously receive partial observations and substantially in real-time estimate the sound fields of the rooms with machine learning based on the partial observations. Accordingly, the components of the network environment 100 can estimate sound fields with less observed information (and potentially using less audio equipment) than existing audio systems.

As used herein, the term "substantially" when used in conjunction with the term "real time" can refer to speeds in which no or little delay occurs as perceptible to a user. Substantially in real time can be associated with a threshold latency requirement that can depend on the specific implementation. In some embodiments, latency under 500 milliseconds, 250 milliseconds, 100 milliseconds, or 1 second can be substantially in real time depending on the specific context.

The computing systems 102A, 102B can send and receive audio data 110A, 110B via the network 106. A first computing system 102A can include a speaker 132A, a microphone 134A, and an AEC 136A. The second computing system 102B can also include a speaker 132B, a microphone 134B, and an AEC 136B. In an example, the first computing system 102A can capture audio from a conference room with a group of participants. The AEC 136A of the first computing system 102A can compare the microphone 134A audio to the audio being sent to the speaker 132A to generate a room impulse response, which can be used by the AEC 136A to determine target audio. The first audio data 110A from the first computing system 102A can include the input audio and the target audio.

The sound field estimation system 104 can receive the first audio data 110A. Before the start of the example conference meeting, the training service 120 of the sound field estimation system 104 can train a generative model 122, such as a variational autoencoder, using training data 112. In some embodiments, the training data 112 can include, but is not limited to, impulse response data from microphone arrays captured in different room types, the type of room, other room characteristics, reverberation time, clarity, microphone type, etc. The inference service 110 can determine a vector that estimates the sound field at a particular position in the room. The inference service 110 can use an initial null vector and a measurement vector from the input audio and a decoder of the generative model 122 to obtain a latent representation. The inference service 110 with the generative model 122 can perform a retraction that maps from the tangent space back onto the manifold. Accordingly, the inference service 110 can calculate an estimated vector for the desired position, which can be used by the sound field estimation system 104 and/or the first computing system 102A to filter the second audio data 110B and cause the speaker 132A of the first computing system 102A to output sound as if the remote participant uttered the speech from the desired position in the room.

In some embodiments (while not illustrated in FIG. 1), some aspects of the sound field estimation system 104 can be implemented locally in the computing systems 102A, 102B. For example, the inference service 110 and the generative model 122 can execute locally in the first computing system 102A. Accordingly, the first computing system 102A can estimate a sound field substantially in real-time without communicating with the sound field estimation system 104. Moreover, in some embodiments, the first computing system 102A and the second computing system 102B can send and receive audio data 110A, 110B substantially in real-time without communicating with the sound field estimation system 104. The computing systems 102A, 102B can transmit audio data audio data 110A, 110B via a decentralized communications model in which each of the computing systems 102A, 102B have the same or similar networking capabilities, which is also known as peer-to-peer (P2P) network.

The network 106 may be any wired network, wireless network, or combination thereof. In addition, the network 106 may be a personal area network, local area network, wide area network, cable network, satellite network, cellular telephone network, or combination thereof. In addition, the network 106 may be an over-the-air broadcast network (e.g., for radio or television) or a publicly accessible network of linked networks, possibly operated by various distinct parties, such as the Internet. In some embodiments, the network 106 may be a private or semi-private network, such as a corporate or university intranet. The network 106 may include one or more wireless networks, such as a Global System for Mobile Communications (GSM) network, a Code Division Multiple Access (CDMA) network, a Long-Term Evolution (LTE) network, or any other type of wireless network. The network 106 can use protocols and components for communicating via the Internet or any of the other aforementioned types of networks, such as HTTP, TCP/IP, and/or UDP/IP.

In some embodiments, the sound field estimation system 104 can be implemented by one or more virtual machines implemented in a hosted computing environment. The hosted computing environment may include one or more rapidly provisioned and/or released computing resources. The computing resources may include hardware computing, networking and/or storage devices configured with specifically configured computer executable instructions. A hosted computing environment may also be referred to as a "serverless," "cloud," or "distributed" computing environment.

Figure 2:
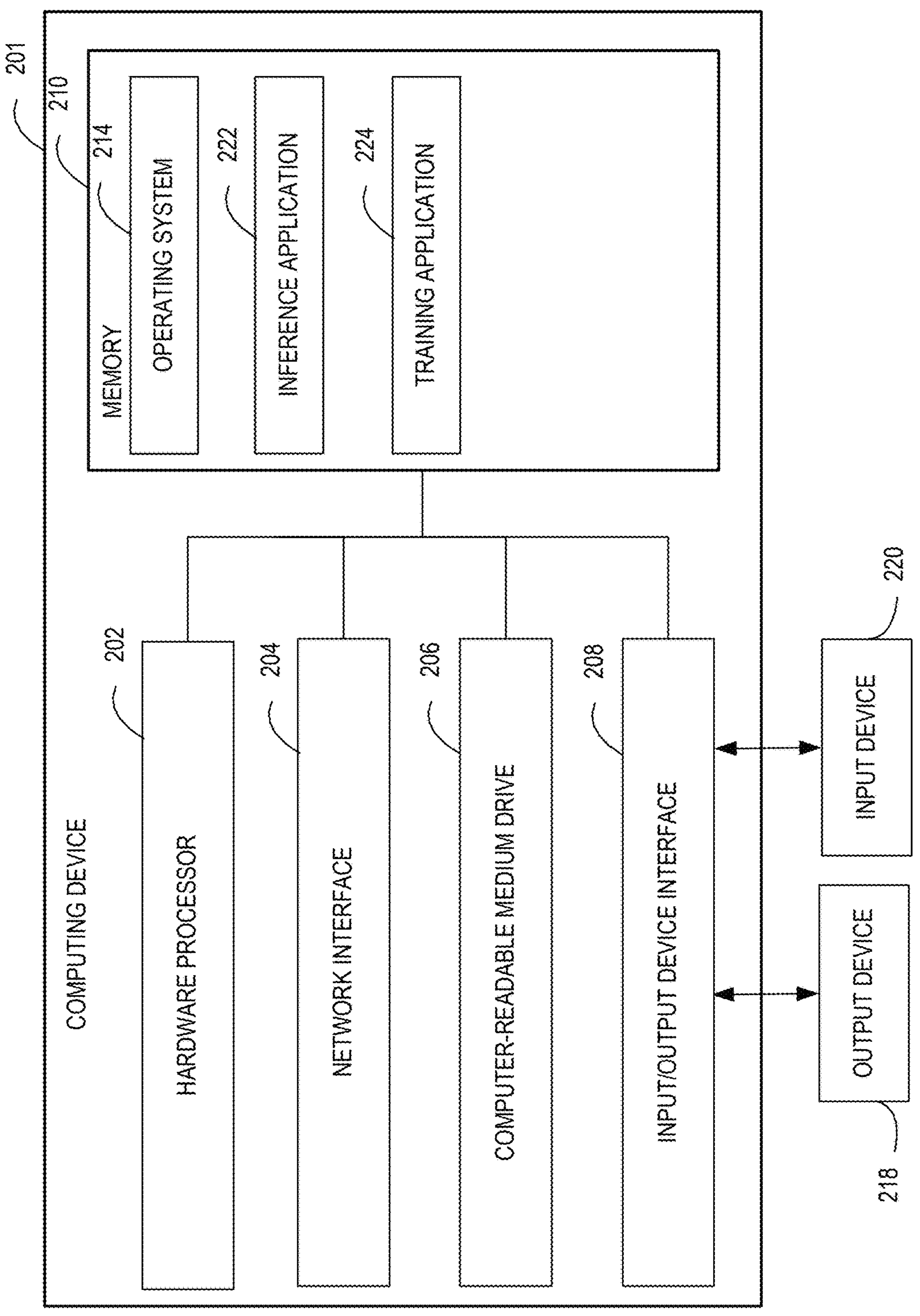
FIG. 2 is a schematic block diagram depicting an illustrative general architecture of a computing device.

FIG. 2 is a schematic diagram of an illustrative general architecture of a computing device 201 for implementing aspects of the sound field estimation system 104 referenced in the environment 100 in FIG. 1. As described herein, the sound field estimation system 104 can extrapolate a sound field at unknown positions in a new environment using partial observations. The computing device 201 includes an arrangement of computer hardware and software components that may be used to execute the inference application 222 and/or the training application 224. The general architecture of FIG. 2 can be used to implement other devices described herein, such as the computing systems 102A, 102B referenced in FIG. 1. The computing device 201 may include more (or fewer) components than those shown in FIG. 2. Further, other computing systems described herein may include similar implementation arrangements of computer hardware and/or software components.

The computing device 201 for implementing aspects of the sound field estimation system 104 may include a hardware processor 202, a network interface 204, a non-transitory computer-readable medium drive 206, and an input/output device interface 208, all of which may communicate with one another by way of a communication bus. As illustrated, the computing device 201 is associated with, or in communication with, an output device 218 and an input device 220. The network interface 204 may provide the computing device 201 with connectivity to one or more networks or computing systems. The hardware processor 202 may thus receive information and instructions from other computing systems or services via the network 106. The hardware processor 202 may also communicate to and from memory 210 and further provide output information (such as audio data) for the output device 218, such as a speaker, via the input/output device interface 208. The input/output device interface 208 may accept input from the input device 220, such as a microphone, video camera, keyboard, mouse, digital pen, and/or touch screen.

The memory 210 may contain specifically configured computer program instructions that can be executed by the hardware processor 202. The memory 210 generally includes RAM, ROM and/or other persistent or non-transitory computer-readable storage media. The memory 210 may store an operating system 214 that provides computer program instructions for use by the hardware processor 202 in the general administration and operation of the computing device 201.

The memory 210 may include the inference application 222 and/or the training application 224 that may be executed by the hardware processor 202. In some embodiments, the inference application 222 and/or the training application 224 may implement various aspects of the present disclosure. As described herein, the training application 224 can train a generative model on impulse response data from microphone arrays captured in different room types, the type of room, other room characteristics, reverberation time, clarity, microphone type, etc. The inference application 222 can calculate an estimated vector for the desired position. The inference application 222 can receive input data that includes input audio data and target audio data for a new room. The input data can also include other features, such as, but not limited to, the type of room, other room characteristics, reverberation time, clarity, microphone type, etc. The inference application 222 can use an initial null vector, the input audio, the target audio, and/or other features as input to the generative model 122 to obtain a latent representation. The inference application 222 with the generative model 122 can perform a retraction that maps from the tangent space back onto the manifold. As described herein, the determined vector can be used to create sound that gives the acoustic impression that the sound came from specific positions in the room.

Figure 3:
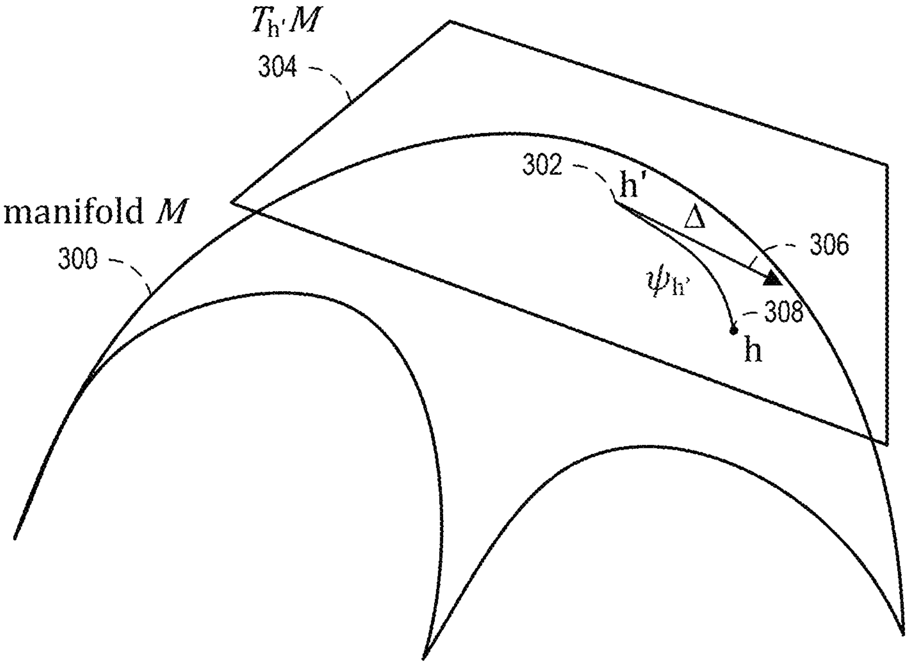
FIG. 3 depicts a retraction on a manifold and a tangent space.

FIG. 3 depicts a retraction on the manifold M 300. The manifold M 300 is a topological space that is locally Euclidean. A tangent bundle TM is the union of all tangent spaces over all points on the manifold M. In signal processing and, in particular, adaptive filtering, it can be assumed that high-dimensional data can lie on a manifold that can be globally isometric to a subset of low-dimensional data in a Euclidean space. Accordingly, as described herein, modeling data to a manifold and low-dimensional parameterization of high-dimensional data can lead to decreased computational complexity and increased convergence speed in solving optimization problems.

A retraction can be a local parameterization in the Euclidean tangent space. In other words, a retraction on the manifold M is a smooth mapping ω from the tangent bundle TM onto the manifold M with the following properties, let $\psi_h$ denote the restriction of ψ to $T_hM$: (i) $\psi_h(0_h)=h$, where Oh denotes the zero element of $T_hM$; and (ii) the canonical identification $T_{0_h}T_hM \approx T_hM$, $\psi_h$ satisfies $D\psi_h(0_h)=id_{T_hM}$, where $id_{T_hM}$ denotes the identify mapping on $T_hM$. As shown in FIG. 3, the tangent space $T_{h'}M$ 304 is the vector space that contains the possible directions in which vectors can tangentially pass through the point h' 302 on the manifold M 300. Moreover, as described herein, the depicted retraction allows movement in the direction of the tangent vector A 306 from the point h' 302 to the new point h 308 while staying on the manifold M 300.

Figure 4:
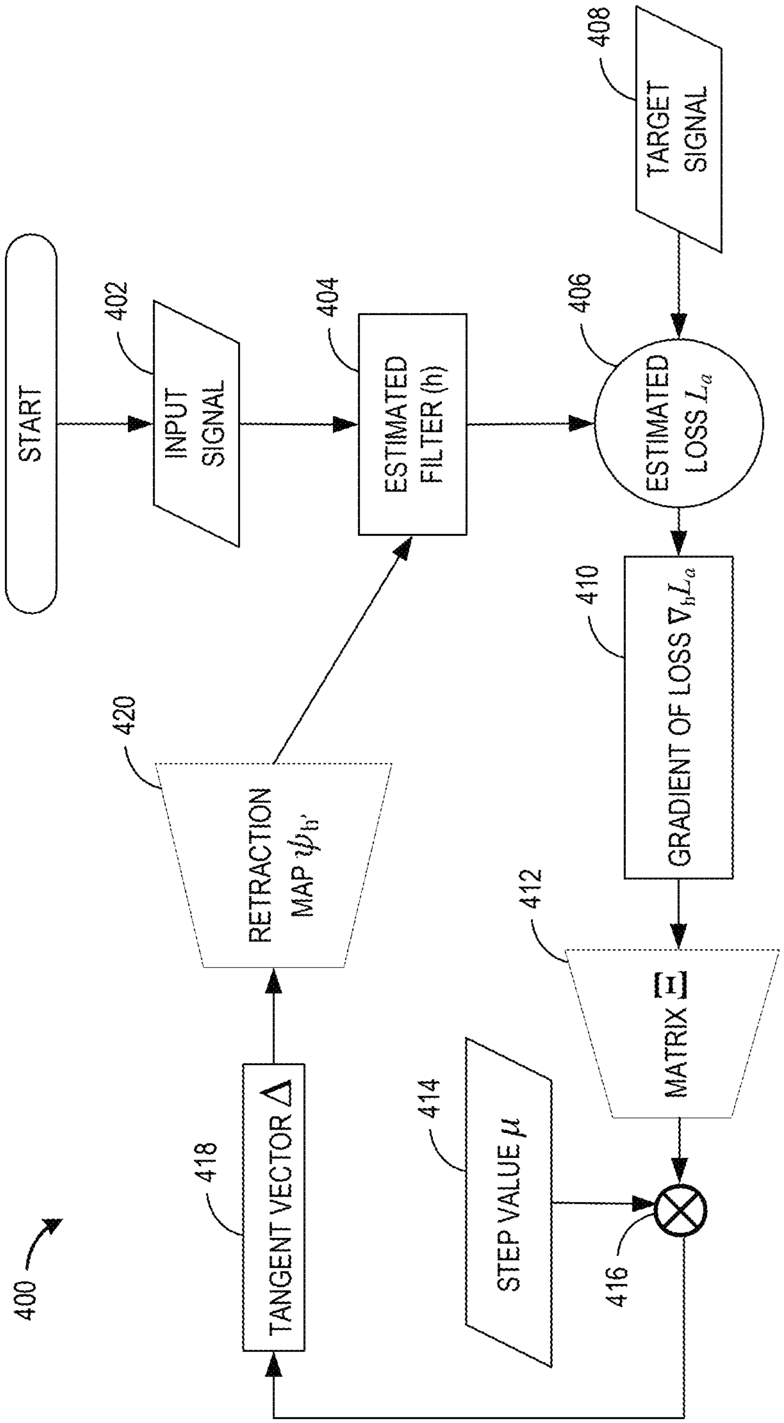
FIG. 4 is a flow chart depicting a method implemented by the inference service for retraction and generative model based adaptive filter optimization.

FIG. 4 includes a flow chart depicting a computer-implemented method 400 for retraction and generative model based adaptive filter optimization. As described herein, the sound field estimation system 104 may be implemented with the computing device 201. In some embodiments, the computing device 201 may include the inference application 222, which may implement aspects of the method 400. The method 400 can solve a system identification problem, i.e., the adaptive filter optimization problem, with a retraction and/or generative model based approaches that were not available in existing systems. The method 400 can advantageously be used to estimate a sound field at unknown positions in a new environment with partial observations.

Beginning at block 402, an input signal can be received. The input signal can be the sound captured from a room. At block 404, the input signal can be filtered with the estimated filter (h) that results in a replicated target signal. At block 406, a loss of the adaptive filter is estimated with the loss function $L_a$ based on the replicated target signal and the actual target signal 408. At block 410, a gradient of the estimated loss $\nabla_h L_a$ with respect to the estimated filter (h) can be calculated. At block 412, a matrix Ξ (such as a Jacobi matrix) of the retraction map can be calculated. In some embodiments, the matrix Ξ can be obtained from a trained generative model, such as the Jacobi of a decoder of a trained variational autoencoder. At block 416, the gradient of the estimated loss $\nabla_h L_a$ can be combined with the matrix Ξ and a step value 414, which can result in the tangent vector Δ 418. In some embodiments, the combining at block 416 can include a tensor product ⊗ of the vector spaces. For example: (gradient of the estimated loss $\nabla_h L_a$ ⊗ matrix Ξ) ⊗ step value p 414. At block 420, the retraction map $\psi_{h'}$ from the tangent space can be applied at the previous point h' onto the learned manifold to provide the updated filter parameters (h). The retraction mapping can be provided by a decoder of the trained generative model, such as a decoder of the trained variational autoencoder.

In the retraction-based approach of the method 400, the optimization can be done in the Euclidean tangent space by translating the filter parameters by the tangent vector Δ 418. The updated parameters can be determined based on mapping back onto the manifold by the retraction mapping ψ of the tangent space at previous point h'. The adaptive filter optimization problem can correspond to the following equation:

$$\Delta_{opt} = \underset{\Delta \in R^L}{\operatorname{argmin}} L_a(\psi_h, (\Delta)).$$

Finding the optimal point over time t iteratively can be done by solving the following differential equation:

$$\frac{d\Delta}{dt} = \nabla_\Delta L_a,$$

which can be solved using the Euler method until some threshold is satisfied, such as a steady state. The gradient of the loss with respect to the tangent space can be obtained using the chain rule:

$$\nabla_\Delta L_a(\psi_h, (\Delta))|_{\Delta=0} = \left.\frac{\partial(\psi_{h'}^T)}{\partial(\Delta)}\right|_{\Delta=0} \frac{\partial(L_a)}{\partial(h')}.$$

The update for the Euler method in the Euclidean tangent space with a step value μ can correspond to the following equations:

$$\Delta(n) = \Delta(n-1) - \mu \cdot \Xi \cdot \frac{\partial(L_a)}{\partial(h')}, \text{ and } \Xi := \left.\frac{\partial(\psi_{h'}^T)}{\partial(\Delta)}\right|_{\Delta=0}.$$

As described herein, a retraction onto the manifold can provide an updated parameters vector. Accordingly, the retraction mapping to h, $h=\psi_h(\Delta)$, can be provided by the decoder of the trained generative model, such as the decoder of the trained variational autoencoder.

Figure 5:
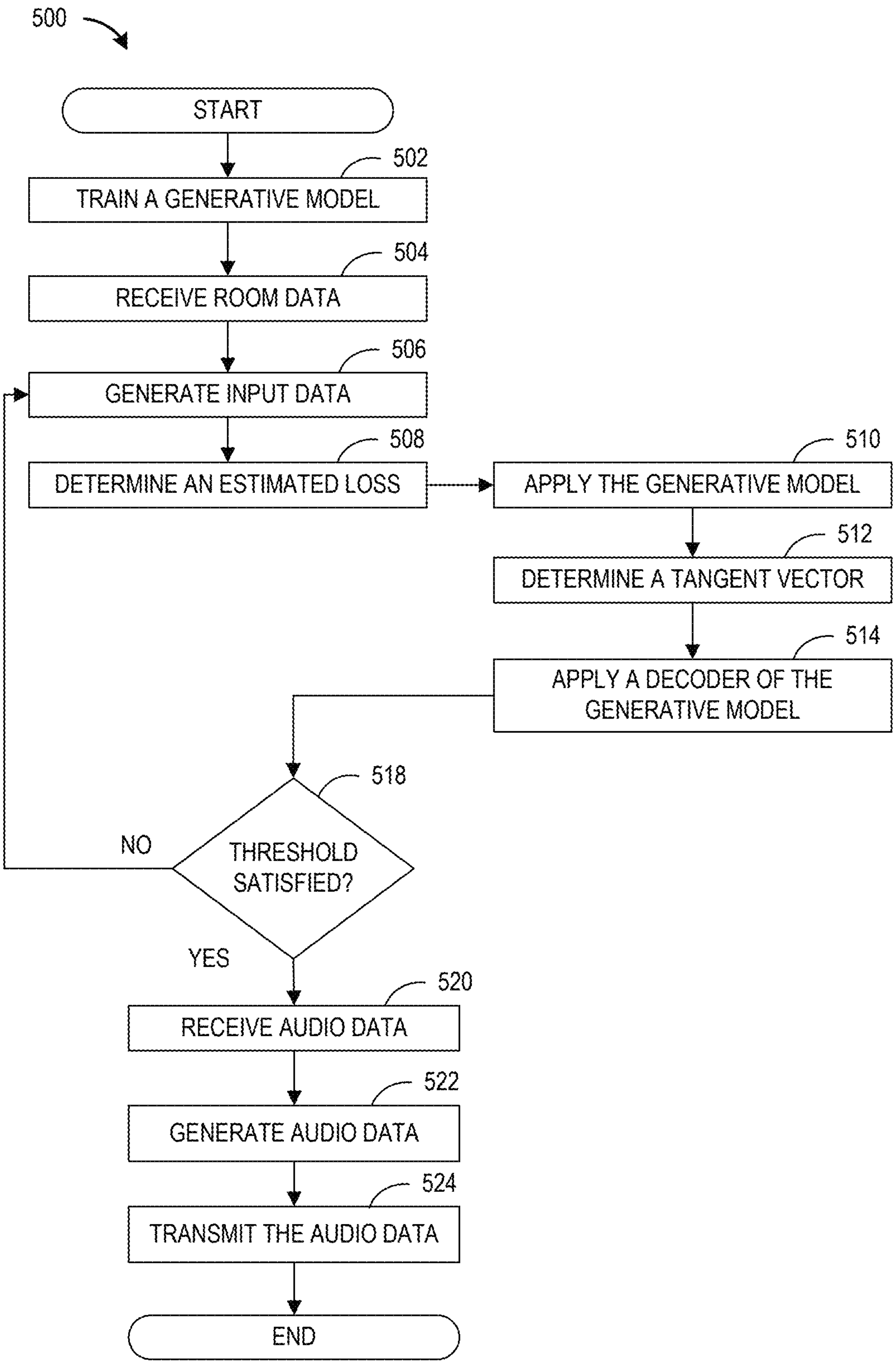
FIG. 5 is a flow chart depicting a method implemented by the sound field estimation system for estimating sound fields using partial observations.

FIG. 5 includes a flow chart depicting a computer-implemented method 500 for estimating a sound field using partial observations. The method 500 can enable sound field estimation at unknown positions in a new environment with partial observations via a generative model, which was not available in existing systems. In particular, the sound field estimation techniques of the method 500 can use manifolds, tangent spaces, and retractions that can lead to decreased computational complexity and, therefore, reduced usage of computational resources in solving optimization problems. As described herein, the method 500 can be applied to a teleconference, virtual reality, or augmented reality context to give the impression that all participants are in the same room. In particular, the generated audio can give the impression that speech of a remote participant originated position.

Beginning at block 502, a generative model can be trained. The training service 120 can train a generative model. As described herein, the generative model can include a variational autoencoder, such as a topology aware variational autoencoder. Variational autoencoders can have an artificial neural network architecture. The variational autoencoder can include at least two neural networks: a first neural network for encoding data into a latent space and a second neural network for decoding, which can also be referred to as a decoder. The training service 120 can train a machine learning model with training data. The training data can include impulse responses for rooms as input training data and training labels. The training data can also include a position relative to a source in the room for each impulse response. As described herein, the impulse response training data can be obtained from recording rooms with computing systems that include microphone arrays and an AEC. In some embodiments, the training data can also include the respective room type, room characteristics, reverberation time, clarity, microphone type, etc. For example, different room types can be represented in the training data as a numerical value, such as particular number for a concert hall type, a living room type, a small office type, a small conference room type, etc. In some embodiments, the room type in the training data can include at least one of a small room type, a medium room type, or a large room type. During training, the training service 120 can determine a loss and a gradient for one or more neural networks. The training service 120 can also update, based on the loss and the gradient, a weight (which can include a bias) of a neural network that results in the trained generative model. In particular, the training service 120 can, for multiple iterations, feed the autoencoder architecture (the encoder followed by the decoder) with initial training data, compare the encoded-decoded output with the initial data, and backpropagate the error through the architecture to update the weights of the neural networks. In some embodiments, instead of training a single generative model for different room types, the training service 120 can train different generative models for each respective room type.

In some embodiments, the training service 120 can train a topology aware variational autoencoder. In some cases, variational autoencoder may not preserve the topology between the input and the latent space. During training, the training service 120 can constrain a variational autoencoder to approximate a simplicial map satisfying the condition represented by the following equation.

$$\varphi\left(\sum_{j=1}^{k} \Upsilon_j \sigma_j\right) = \sum_{j=1}^{k} \Upsilon_j \varphi(\sigma_j)$$

In the foregoing equation, φ denotes the mapping performed by the encoder, σ can be a k-simplex in a simplicial complex K, and Y can be a convex coefficient vector. This condition can indicate that the vertices of a simplex in the input space spans a simplex in the latent space, as shown in the following equation.

$$L_t(\varphi, K, \alpha) = \sum_{\sigma \in K} \varepsilon_{\Upsilon_j \sim Dir(dim(\sigma),\alpha)} L_t\left(\varphi\left(\sum_{j=1}^{dim(\sigma)} \Upsilon_j \sigma_j\right), \sum_{j=1}^{dim(\sigma)} \Upsilon_j \varphi(\sigma_j)\right)$$

In the foregoing equation, φ denotes the mapping performed by the encoder, σ can be a k-simplex in a simplicial complex K, $\sigma_j$ can be the vertex j of the dim(σ)-simplex σ, γ can be a convex coefficient vector, and $\varepsilon_{\gamma_j \sim Dir(dim(\sigma),\alpha)}$ can be the expectation for the $(\gamma j)_{j=0, \ldots, dim(\sigma)}$. following a symmetric Dirichlet distribution with the order dim(σ)+1 and the concentration parameter a. During training, the training service 120 can apply a cost function of the variational autoencoder in the following equation that results in a topology aware variational autoencoder: $L := L_r + \lambda L_t$.

Also during training, the training service 120 can relate measured impulse responses and microphone positions with a Kirchhoff-Helmholtz integral. Accordingly, the training service 120 can define a simplicial complex from the provided impulse response measurement positions. The training service 120 can apply a Kirchhoff-Helmholtz integral to the impulse responses at each respective position relative to a source in the room. The training service 120 can apply the following equation for the Kirchhoff-Helmholtz integral.

$$P(r,\omega)=\oint\left(\frac{\partial}{\partial n}\underline{h}(r|r_0,\omega)P(r_0,\omega)-\frac{\partial}{\partial n}P(r_0,\omega)\underline{h}(r|r_0,\omega)\right)dr_0$$

In the foregoing equation, $\underline{h}$ can be Green's function representation in the frequency domain due to a source at the position $r_0$, n can denote the normal vector along the enclosing boundary, $P(r_0,\omega))$ can denote the sound pressure at the position r and the frequency ω, and $\underline{h}(r|r_0,\omega)$ can indicate the acoustic transfer function between the positions r and $r_0$. The training service 120 can define a simplicial complex from the provided impulse response measurements at the positions. The vertices for each simplex can be a discretized boundary for the Kirchhoff-Helmholtz integral. A combination of the vertices in a simplex can provide a point $r_0$ within the simplex (the boundary). The latent space representation of the impulse response from a speaker outside the simplex to a microphone at $r_0$ can be equal to the sum of the latent representations of the impulse responses from a randomly or pseudo-randomly selected speaker position to the vertices after being filtered by the transfer function between the respective vertex and $r_0$.

During training, the training service 120 can determine loss with a loss function. In some embodiments, the loss function can include a regularization term. As described herein, the generative model can be or include a variational autoencoder and the latent space parameterization in a trained variational autoencoder can reflect the topological structure as the input data (as enforced by a particular cost function). During training, the training service 120 can minimize the following cost function, which can be the negative of the evidence lower bound (ELBO).

$$L_r := \varepsilon_h\left[\varepsilon_{z\sim q_\phi(z|h)}[-\log p_\theta(h|z)] + KL(q_\phi(z|h)\|p(z))\right] + D(q_\phi(z)\|p(z))$$

In the foregoing equation, θ denotes the parameters of the decoder, ϕ denotes the parameters of the encoder, z is the latent variable, and D is a regularization term. The use of a regularization term can cause a representation of a Hessian matrix of the adaptive filter cost function in the latent space to be approximately diagonal. An approximately diagonal matrix can refer to a matrix having nonzero elements only in the diagonal and/or substantially constraining the off-diagonal elements in the matrix to be close to zero. The representation matrix can be a covariance matrix where the adaptive filter is a least squares adaptive filter. Ensuring that the representation matrix is approximately diagonal can enable the adaptation algorithm to execute using with fewer computing resources since the off-diagonal elements can be ignored. If the adaptation algorithm is a second order adaptation, the regularization term can disentangle the latent space. Second order adaptation algorithms may require calculating an inverse of a covariance matrix; however, if the covariance matrix is diagonal then that computation can be omitted, thereby reducing complexity. The training service 120 can use the following regularization term.

$$D(q_\phi(z)\|p(z)) := \lambda_{off}\sum_{i\neq j}\left[Cov_{q_\phi(z)}[z]\right]_{ij}^2 + \lambda_{diag}\sum_i\left(\left[Cov_{q_\phi(z)}[z]\right]_{ii}-1\right)^2$$

In the foregoing equation, $\lambda_{off}$ can be a Lagrangian multiplier constraining the off diagonal elements of the covariance matrices, $\lambda_{diag}$ can be another Lagrangian for the diagonal elements, and $$Cov_{q_\phi(z)}[z] := \varepsilon_{q(z)}\left[(z-\varepsilon_{q(z)}[z])(z-\varepsilon_{q[z]}(z))^T\right].$$

At block 504, room data can be received for a new room. The sound field estimation system 104 can receive the room data, which can include, but is not limited to, input audio data and target audio data. In some embodiments the room data can include some impulse response data. The room data can originate from a near end room. The room data can be for a position in the room, such as the position in the room of the microphone that receives the input sound. Moreover, an AEC associated with the room can calculate the target audio data and impulse response data from the input audio data. In some embodiments, the sound field estimation system 104 can estimate a sound field substantially in real-time upon receiving the room data from the near end. Some or all of the subsequent blocks 506, 508, 510, 512, 514, 518, 520, 522, 524 of the method 500 can be performed substantially in real-time upon receiving the room data from the previous block 502. The room data can also include, but is not limited to, a room type, room characteristics, reverberation time, clarity, microphone type, etc. In some embodiments, the room type can include at least one of a small room type, a medium room type, or a large room type.

At block 506, input data can be generated. The inference service 110 can generate input data. The inference service 110 can generate measurement vector data from the input audio data as the data would be represented in the generative model's output data model. The inference service 110 can generate initial input vector data for a second position associated with the near end room. The second position can be relative to the first position, which can be associated with a microphone in the near end room, for example. The initial input vector data can have zeros or some other null value, which can be the missing information in a system identification problem. As described herein, the second position can be the other position in the room that the sound field estimation system 104 will generate audio to emulate sounds as if they had originated from that other position. The inference service 110 can generate input data for the generative model input data from (i) the measurement vector data, (ii) the first position, (iii) the initial input vector data, and (iv) the second position. In some embodiments, the input data can include additional information, such as, but not limited to, a room type, room characteristics, reverberation time, clarity, microphone type, etc.

At block 508, an estimated loss can be determined. The inference service 110 can apply initial filter parameters to the input data that results in filtered data. The inference service 110 can generate target data from at least the target audio data. The inference service 110 can determine an estimated loss, such as a gradient of the loss, from the filtered data and the target data. The inference service 110 can calculate a gradient of the loss with respect to the initial filter parameters. As described herein, such as with respect to FIG. 4, the inference service 110 can calculate the gradient of the loss using the chain rule.

The loss function can be the loss for an adaptive filter. The loss function (which can also be referred to as a cost function) and correspond to the following equation.

$$L_a=\varepsilon\{|e(n)|^2\}=\varepsilon\{|y(n)-h^H x(n)|^2\}$$

In some embodiments, different loss functions can be used. Another loss function can explicitly take into account near-end noise with weighted least-squares or Huber loss. The gradient of the loss function can correspond to the following equation.

$$\nabla_h L_a=-2\varepsilon\{x(n)[y^*(k)-h^T x^*(n)]\}$$

At block 510, the generative model can be applied. The inference service 110 can determine a matrix from a decoder of a trained generative model, such as a variational auto-econder. In some embodiments, the inference service 110 can calculate a matrix Ξ (such as a Jacobi matrix) of the retraction map from the decoder of the generative model. The initial latent representation can be an initial search point for the method 500. The latent representation can be in the tangent space of a manifold. Additional details regarding manifolds, a tangent space, and a matrix of the retraction map are described herein, such as with respect to FIGS. 3 and 4.

At block 512, a tangent vector can be determined. The inference service 110 can combine the matrix, the estimated loss, and a step value that results in a tangent vector. The inference service 110 can combine the foregoing components using a tensor product ⊗ of the vector spaces. In particular, the inference service 110 can calculate the tangent vector from: (gradient of the estimated loss $V_h L_a$⊗matrix Ξ)⊗step value or gradient of the estimated loss $V_h L_a$⊗(matrix Ξ⊗step value). Additional details regarding determining a tangent vector are described herein, such as with respect to FIG. 4.

In some embodiments, the inference service 110 can determine a tangent vector with an inverse Hessian matrix. If the adaptation algorithm is a second order adaptation, a Newton-based update in the tangent space can be derived. The inference service 110 can determine a matrix from the decoder and calculate an inverse Hessian matrix from the matrix. The inference service 110 can calculate a Hessian matrix with the following equation.

$$F(n):=\Xi(n)x(n)x^T(n)\Xi^T(n)$$

The inference service 110 can calculate the tangent vector from the matrix, the inverse Hessian matrix, the estimated loss, and the step value. The second-order update, which can determine the tangent vector, can be specified by the following equation.

$$z(n)=z(n-1)+\mu F^{-1}(n)\Xi(n)x(n)e^*(n)$$

At block 514, a decoder of the generative model can be applied. The inference service 110 can apply a decoder from the trained generative model to a point in a tangent space indicated by the tangent vector. The decoder can output updated filter parameters. In other words, the inference service's 110 application of the decoder can, via retraction, use its mapping to go from the tangent space to the manifold. In particular, the retraction map $\psi_h$, from the tangent space can be applied at the previous point h' onto the learned manifold to provide the updated filter parameters (h), $h=\psi_{h'}(\Delta)$. The output of the decoder can include generated data, which can indicate an impulse response for the new position being solved. Additional details regarding decoders and retraction maps are described herein, such as with respect to FIG. 4.

At block 518, it can be determined whether a threshold is satisfied. The inference service 110 can apply the input signal to updated filter parameters and compare the updated filtered data to the target data. In particular, the inference service 110 can repeat the algorithm for a number of iterations, which can be a predetermined number of iterations. If the threshold is not satisfied, the method 500 can return to blocks 506, 508, 510, 512, 514 to repeat the adaptive filtering optimization steps until the threshold is satisfied. Accordingly, blocks of the method 500 can iteratively determine filter parameters until a threshold is satisfied. If the threshold is satisfied, the method 500 can proceed to blocks 520, 522 to receive and process audio data.

At block 520, audio data can be received. The sound field estimation system 104 and/or the first computing system 102A can receive audio data from the far end, such as the second computing system 102B. For example, the near end room can be a conference room. A remote participant can be at the far end. When the remote participant speaks, the remote participant's speech sounds are converted to audio data and transmitted to the sound field estimation system 104 and/or the first computing system 102A. In some embodiments, the sound field estimation system 104 and/or the first computing system 102A can generate subsequent audio data substantially in real-time upon receiving the audio data from the far end. Some or all of the subsequent blocks 522, 524 of the method 500 can be performed substantially in real-time upon receiving the audio data from the previous block 520. In some embodiments, the blocks 520, 522, 524 for receiving and processing audio data can be performed in parallel with the previous blocks 504, 506, 508, 510, 512, 514 for adaptive filtering optimization on the room data.

At block 522, audio data can be generated. The sound field estimation system 104 can generate near end audio data from (i) the far end audio data, (ii) the updated filter parameters, and (iii) the new position. As described herein, the generated audio data can give the acoustic impression that the speech was uttered from the new position in the near end room. In particular, the sound field estimation system 104 can modify the far end audio data by the updated filter parameters associated with the new position, which can result in an estimate of the desired target signal. In some embodiments, the near end audio data can be generated by the local computing system at the near end.

In some embodiments, the sound field estimation system 104 can generate audio data with de-reverbing and re-reverbing. The sound field estimation system 104, the first computing system 102A, and/or the second computing system 102B can apply a machine learning model to the far end audio data, which results in de-reverbed audio data. In some embodiments, a de-noising algorithm can generate the de-reverbed audio data. In other embodiments, the sound field estimation system 104, the first computing system 102A, and/or the second computing system 102B can generate de-reverbed audio data from a deconvolution of the far end audio data with far end impulse response data. The sound field estimation system 104 and/or the first computing system 102A can determine a near end impulse response from the updated filter parameters at the second position. The sound field estimation system 104 can apply the near end impulse response data at the second position to the de-reverbed audio data that results in the reverbed near end audio data.

At block 524, the near end audio data can be transmitted. In some embodiments, the sound field estimation system 104 can transmit the near end audio data to the near end computing system 102A to be output. The near end computing system 102A can output the near end audio data via the speaker 132A. As described herein, the near end computing system 102A can estimate the sound field locally and generate the near end audio data.

Not necessarily all objects or advantages may be achieved in accordance with any particular embodiment described herein. Thus, certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computer hardware processors. The code modules (including computer-executable instructions) may be stored in any type of non-transitory computer-readable storage medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, and/or elements. Thus, such conditional language is not generally intended to imply that features, and/or elements are in any way required for one or more embodiments or that one or more embodiments necessarily include logic for deciding, with or without user input or prompting, whether these features, and/or elements are included or are to be performed in any particular embodiment. The terms "comprising," "including," "having," and the like are synonymous and are used inclusively, in an open-ended fashion, and do not exclude additional elements, features, acts, operations, and so forth. Further, the term "each," as used herein, in addition to having its ordinary meaning, can mean any subset of a set of elements to which the term "each" is applied.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method for estimating a sound field for virtual reality or augmented reality, comprising:

receiving, for a first position associated with a near end room, room data comprising (i) input audio data and (ii) target audio data;

generating measurement vector data from the input audio data;

generating initial input vector data for a second position associated with the near end room;

generating input data from (i) the measurement vector data, (ii) the first position, (iii) the initial input vector data, and (iv) the second position;

applying initial filter parameters to the input data that results in filtered data;

generating target data from the target audio data;

determining an estimated loss from the filtered data and the target data;

determining a matrix from a decoder of a trained variational autoencoder;

combining the matrix, the estimated loss, and a step value that results in a tangent vector;

applying the decoder to a point in a tangent space indicated by the tangent vector, wherein the decoder outputs updated filter parameters;

receiving far end audio data;

in response to receiving the far end audio data, substantially in real-time:

generating near end audio data from (i) the far end audio data, (ii) the updated filter parameters, and (iii) the second position; and outputting the near end audio data.

2. The computer-implemented method of claim 1, further comprising:

training a machine learning model with training data comprising a plurality of impulse responses for a second room as input training data and a training label, wherein the training data further comprises, for each impulse response in the plurality of impulse responses, a position relative to a source in the second room, and wherein training the machine learning model further comprises:

determining a loss and a gradient of a neural network; and updating, based on the loss and the gradient, a weight of the neural network that results in the trained variational autoencoder.

3. The computer-implemented method of claim 2, wherein the training data further comprises a room type for the second room, and the input data further comprises a near end room type.

4. The computer-implemented method of claim 1, wherein generating the near end audio data further comprises:

applying a machine learning model to the far end audio data, wherein the machine learning model outputs de-reverbed audio data.

5. The computer-implemented method of claim 4, wherein generating the near end audio data further comprises:

determining a near end impulse response from the updated filter parameters at the second position; and applying the near end impulse response at the second position to the de-reverbed audio data that results in the near end audio data as reverbed.

6. The computer-implemented method of claim 1, further comprising:

iteratively determining filter parameters until a threshold is satisfied.

7. One or more non-transitory computer-readable storage media storing computer executable instructions that when executed by a computing system perform operations comprising:

receiving, for a first position associated with a near end room, room data comprising (i) input audio data and (ii) target audio data;

generating measurement vector data from the input audio data;

generating initial input vector data for a second position associated with the near end room;

generating input data from (i) the measurement vector data, (ii) the first position, (iii) the initial input vector data, and (iv) the second position;

applying initial filter parameters to the input data that results in filtered data;

generating target data from the target audio data;

determining an estimated loss from the filtered data and the target data;

determining a matrix from a decoder of a trained generative model;

combining the matrix, the estimated loss, and a step value that results in a tangent vector;

applying the decoder to a point in a tangent space indicated by the tangent vector, wherein the decoder outputs updated filter parameters;

receiving far end audio data;

in response to receiving the far end audio data, substantially in real-time:

generating near end audio data from (i) the far end audio data, (ii) the updated filter parameters, and (iii) the second position; and transmitting the near end audio data.

8. The one or more non-transitory computer-readable storage media of claim 7 storing further computer-executable instructions that when executed by the computing system perform further operations comprising:

training a machine learning model with training data comprising a plurality of impulse responses for a second room as input training data and a training label, wherein the training data further comprises, for each impulse response in the plurality of impulse responses, a position relative to a source in the second room, and wherein training the machine learning model further comprises:

determining a loss and a gradient of a neural network; and updating, based on the loss and the gradient, a weight of the neural network that results in the trained generative model.

9. The one or more non-transitory computer-readable storage media of claim 8, wherein determining the loss of the neural network further comprises:

applying a loss function with a regularization term, wherein the regularization term causes a representation of a Hessian matrix of an adaptive filter cost function in a latent space to be approximately diagonal.

10. The one or more non-transitory computer-readable storage media of claim 7, wherein combining the matrix, the estimated loss, and the step value further comprises:

calculating an inverse Hessian matrix from the matrix; and calculating the tangent vector from the matrix, the inverse Hessian matrix, the estimated loss, and the step value.

11. The one or more non-transitory computer-readable storage media of claim 7, wherein generating the near end audio data further comprises:

applying a machine learning model to the far end audio data, wherein the machine learning model outputs de-reverbed audio data.

12. The one or more non-transitory computer-readable storage media of claim 11, wherein generating the near end audio data further comprises:

determining a near end impulse response from the updated filter parameters at the second position; and applying the near end impulse response at the second position to the de-reverbed audio data that results in the near end audio data as reverbed.

13. The one or more non-transitory computer-readable storage media of claim 7, wherein the trained generative model comprises a variational autoencoder.

14. A system comprising:

a non-transitory data storage medium; and a computer hardware processor in communication with the non-transitory data storage medium, wherein the computer hardware processor is configured to execute computer-executable instructions to at least:

receive, for a first position associated with a near end room, room data comprising (i) input audio data and (ii) target audio data;

generate measurement vector data from the input audio data;

generate initial input vector data for a second position associated with the near end room;

generate input data from (i) the measurement vector data, (ii) the first position, (iii) the initial input vector data, and (iv) the second position;

apply initial filter parameters to the input data that results in filtered data;

generate target data from the target audio data;

determine an estimated loss from the filtered data and the target data;

determine a matrix from a decoder of a trained generative model;

combine the matrix, the estimated loss, and a step value that results in a tangent vector;

apply the decoder to a point in a tangent space indicated by the tangent vector, wherein the decoder outputs updated filter parameters;

receive far end audio data;

generate near end audio data from (i) the far end audio data, (ii) the updated filter parameters, and (iii) the second position; and transmit the near end audio data.

15. The system of claim 14, wherein the computer hardware processor executes additional computer-executable instructions to at least:

train a machine learning model with training data comprising a plurality of impulse responses for a second room as input training data and a training label, wherein the training data further comprises, for each impulse response in the plurality of impulse responses, a position relative to a source in the second room, and wherein to train the machine learning model, the computer hardware processor executes the additional computer-executable instructions to at least:

determine a loss and a gradient of a neural network; and update, based on the loss and the gradient, a weight of the neural network that results in the trained generative model.

16. The system of claim 15, wherein to train the machine learning model with the training data, the computer hardware processor executes further computer-executable instructions to at least:

apply a Kirchhoff-Helmholtz integral to the plurality of impulse responses at a respective position relative to the source in the second room.

17. The system of claim 15, wherein the training data further comprises a room type for the second room, and the input data further comprises a near end room type.

18. The system of claim 17, wherein the room type comprises at least one of a small room type, a medium room type, or a large room type.

19. The system of claim 14, wherein to generate the near end audio data, the computer hardware processor executes additional computer-executable instructions to at least:

apply a machine learning model to the far end audio data, wherein the machine learning model outputs de-reverbed audio data.

20. The system of claim 19, wherein to generate the near end audio data, the computer hardware processor executes further computer-executable instructions to at least:

determine a near end impulse response from the updated filter parameters at the second position; and apply the near end impulse response at the second position to the de-reverbed audio data that results in the near end audio data as reverbed.

* * * * *